United States Patent [19]

Messler et al.

[11] 4,060,928

[45] Dec. 6, 1977

[54] FISH HOOK

[76] Inventors: Joseph P. Messler, 4410 E. 46th Place, Tulsa, Okla. 74135; Thomas E. Messler, 5740 S. 72nd E. Ave.; James P. Messler, 7832 S. 70th E. Ave., both of Tulsa, Okla. 74136

[21] Appl. No.: 655,902

[22] Filed: Feb. 6, 1976

[51] Int. Cl.² ............................................. A01K 83/00
[52] U.S. Cl. ................................... 43/43.16; 43/42.24
[58] Field of Search .................... 43/43.16, 44.8, 42.24

[56] References Cited

U.S. PATENT DOCUMENTS

| 1,706,881 | 3/1929 | Hampson | 43/43.16 |
|---|---|---|---|
| 2,101,491 | 12/1937 | Chilcott | 43/43.16 |
| 2,233,338 | 2/1941 | Brewer | 43/43.16 |
| 2,995,858 | 8/1961 | Rathmann | 43/44.8 |
| 3,023,536 | 3/1962 | Williams | 43/43.16 |
| 3,724,116 | 4/1973 | Lindner et al. | 43/42.24 |

FOREIGN PATENT DOCUMENTS 93,059  10/1958  Norway .............................. 43/43.16

*Primary Examiner*—Warner H. Camp
*Attorney, Agent, or Firm*—Head, Johnson & Chafin

[57] ABSTRACT

A fish hook specifically designed and constructed for use with artificial worms and provided with means for causing the hook to rotate within a fish's mouth to a substantially vertical position to prevent hooking the fish in the soft side portions of the fish's mouth. The hook is also specifically designed for attachment to the artificial worm in a manner whereby the worm moves through the water without twisting the line and whereby the barbed portion of the hook is fully exposed when struck by a fish.

8 Claims, 10 Drawing Figures

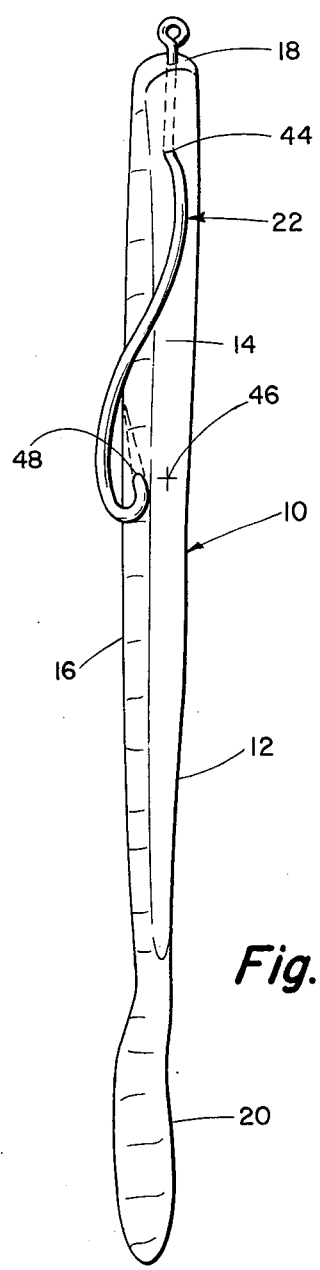
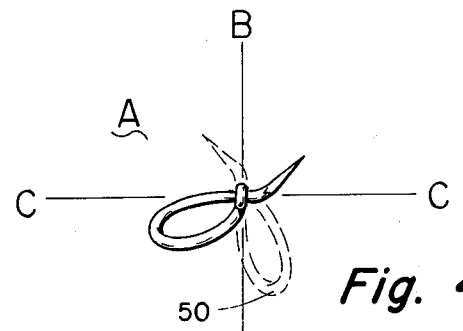
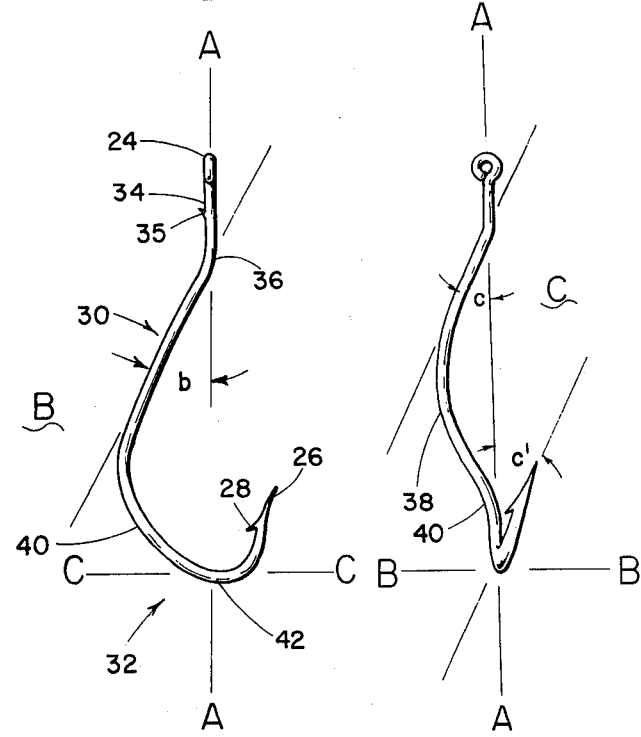
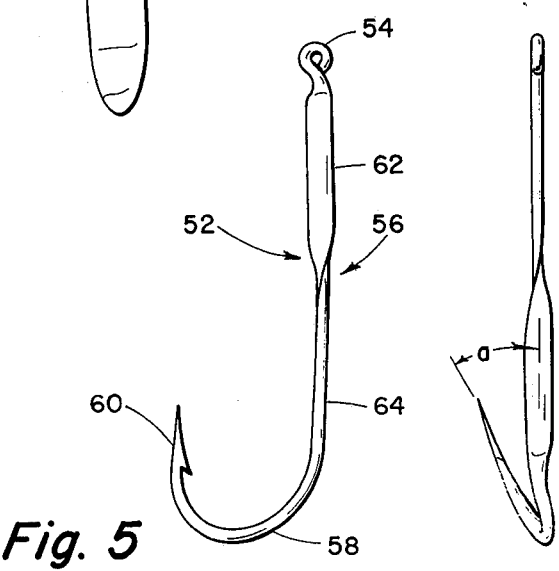
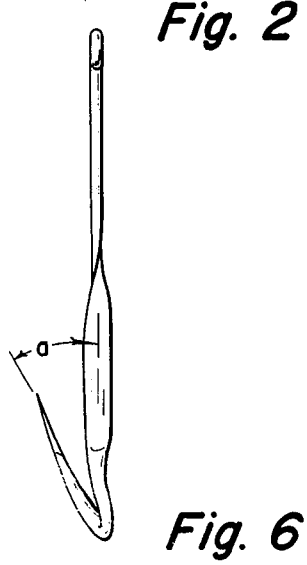
Fig. 1
Fig. 4
Fig. 2
Fig. 3
Fig. 5
Fig. 6

FISH HOOK

BACKGROUND OF THE INVENTION

1. Field of the Invention

The present invention relates to a fish hook and more specifically but not by way of limitation to a fish hook having means to cause rotation thereof in a fish's mouth in order to effect hooking in the tougher part of the fish's mouth rather than the softer side portions thereof. The rotation is effected by the shank configuration acted upon by the pressure of the fish's mouth coupled with simultaneous pulling of the fishing line.

2. Description of the Prior Art

In recent years, there has developed a variation of lure fishing which is almost a separate art in its own right — that of plastic worm fishing. This art, in effect has combined the desirable aspects of both lure and bait fishing by providing an elongated flexible simulated worm made of a soft plastic which is threaded by various methods on a fish hook.

The plastic may be provided with a scent to attract fish and the material is pliable in order to closely simulate the physical characteristics of a worm. Naturally, the plastic material must be soft enough to be easily penetrated by a hook yet strong enough to hold together during manipulation thereof through the water, over rocks, around brush and other debris.

One popular method of attaching the worm to the hook is commonly called the "Texas Rig" utilizing a standard hook wherein the entire hook, shank and curved portion lies in a single plane. The hook is inserted in one end of the worm, out of the bottom of the worm adjacent the end and is then rotated 180°. The barbed end of the hook is then reinserted back into the bottom surface of the worm. This rigging substantially covers the pointed end of the hook which serves to prevent the hook from getting hung up in the brush and the like when being manipulated through the water. When the fish bite and pull against the lure, the hook hopefully comes out of the lure and penetrates the fish's mouth.

However, it is often the case, especially in the use of large hooks and worms, that when the fish bites down on the lure, the hook turns sideways or the plane of the hook aligns itself with the sides of the fish's mouth which results in its either slipping out or catching the side of the fish's mouth. The side of the fish's mouth is the weakest portion thereof and often tears loose resulting in the loss of the fish.

Further, it is necessary that the end of the hook along with the barb be fully exposed after the fish has taken the lure in order to secure the hook into the fish's mouth. However, another disadvantage with the existing equipment lies in the tendency of the plastic worm, upon being taken by the fish, to bunch up around the barbed end of the hook thereby not allowing the end of the hook to exit the worm, which again results in the loss of the fish.

SUMMARY OF THE PRESENT INVENTION

The present invention is particularly designed and constructed to overcome the above disadvantages while still making use of the good points or advantages of the prior art methods and apparatus.

No change has been made to the plastic worm itself, but rather to the configuration of the hook and the method of placing the worm thereon. The hook can be best described by its deviation from a prior art hook. The prior art hook has an eyelet at one extremity for attaching a fishing line. The other end is provided with a barbed sharpened tip. The leading portion of shank which is attached to the eyelet is straight or bent by an amount between 0° and 45° out of line with the straight portion attached to the eyelet. The trailing portion of the shank is curved into a bow turning through approximately 180° in the opposite direction from the aforementioned bend so that the barbed tip end of the hook extends beyond alignment with the leading shank portion and points back generally toward the eyelet. The prior art hook above described is constructed to lie within a single plane.

The hook of the present invention possesses the same components as the prior art hook described but deviates in configuration in the following manner:

The leading portion of the shank at or about the location of the first mentioned bend is further bent in a direction out of the plane of the described hook. The shank portion trailing the said bend or compound bends is then curved into an arc and extends back into the said plane intersecting the plane at its attachment point with the bow. The barbed tip portion of the hook is then curved out of the said plane in a direction opposite that of the arc and terminates diametrically opposite the trailing portion of the arc.

Therefore, when the hook is taken by a fish in a sideways position with the sharpened tip in substantial alignment with the side of the fish's mouth, a pull in the line will cause the arc portion of the hook to be pulled through the fish's bite, and since the arc extends out of the said plane, the hook will rotate within the fish's mouth thereby causing the sharpened tip thereof to engage either the top or bottom of the fish's mouth according to the direction of the rotation. This rotation action will occur whether or not the hook is baited or connected with a plastic worm.

In connecting the present invention with a plastic worm, the hook is passed through the end of the worm and out the bottom thereof adjacent to the said end. Then, since the tip portion of the hook is curved out of the said plane, the tip may be reinserted into the side of the worm instead of the bottom as with conventional hooks, and without having to twist the worm. Hence, when the worm is pulled through the water, it will not try to cork screw but will track straight. Further, when taken by the fish, the end of the worm will be pulled away from the leading portion of the shank onto the arc. That coupled with the rotation of the hook within the fish's mouth will prevent the worm from bunching up on the barbed tip but instead will move it aside thereby allowing the entire barbed tip to clear the worm and penetrate the top or bottom of the fish's mouth.

A second embodiment of the invention provides an alternate means for rotating the hook within the fish's mouth. This embodiment comprises a hook constructed of a flat strip of material which is twisted so that the flat portion of the material, corresponding to the arc portion of the first embodiment, is in a plane perpendicular to the plane of the bow portion which will also cause the hook to rotate within the fish's mouth in order to align the pointed portion thereof with either the top or bottom of the fish's mouth.

The barbed tip for the second embodiment is also curved out of the plane of the hook thereby allowing the said tip to be inserted into the side of the worm instead of the bottom as hereinbefore described.

DESCRIPTION OF THE DRAWINGS

Other and further advantageous features of the present invention will hereinafter more fully appear in connection with a detailed description of the drawings in which;

FIG. 1 is a prospective view of a plastic worm fitted with a hook embodying the present invention.

FIG. 2 is a detailed view of the hook in FIG. 1.

FIG. 3 is a detailed view of the hook in FIG. 2 rotated 90°.

FIG. 4 is an end detailed view of the hook of FIG. 1.

FIG. 5 is a detailed view of a second embodiment of the hook.

FIG. 6 is a detailed view of the hook of FIG. 5 rotated 90°.

DETAILED DESCRIPTION OF THE PREFERRED EMBODIMENTS

Figure 9:
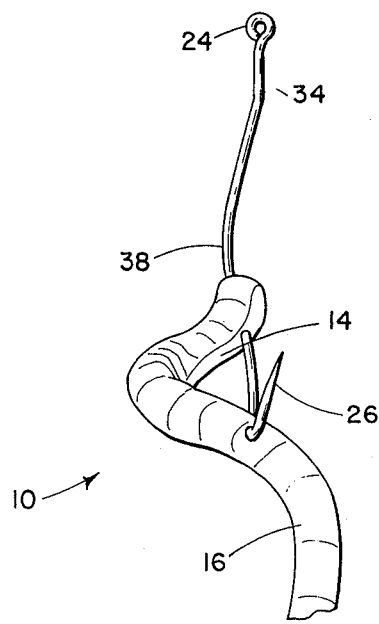
FIG. 9 is a view of plastic worm and hook of FIG. 1 showing the end of the worm having been pulled down over the shank of the hook.
Figure 10:
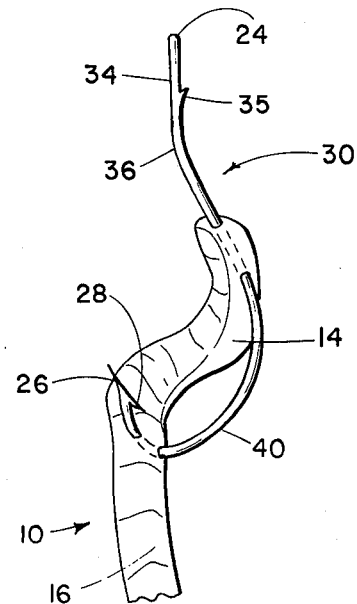
FIG. 10 is a side elevational view of the worm and hook of FIG. 9.

Referring to the drawings in detail, specifically in FIG. 1, reference character 10 generally indicates an artificial worm made from various rubber or plastic compounds and generally comprises an elongated body portion 12 having a flattened bottom side 14 with a ridged back surface 16. The worm terminates at the leading end with a flattened end portion 18 and is provided with a trailing or tail portion 20 at the opposite end.

The production of plastic worms however varies in many respects but normally includes the basic elements that are hereinbefore pointed out. For example, on some production worms there is no distinct belly or bottom portion 14 as described in the drawings nor is there necessarily traversely extending ridges as the ridged surface 16 shown. However, for purposes of description of the invention this particular and very commonly used plastic worm is being described as above.

Reference character 22 generally indicates a fish hook which may be utilized with ordinary bait but is particularly designed and constructed for use with a plastic worm type described above and indicated by reference character 10. To aid in the description of the hook 22, the hook is described in three mutually perpendicular views, FIGS. 2, 3 and 4.

FIG. 2 depicts a pair of mutually perpendicular intersecting lines A—A, and C—C which lie within a plane B.

FIG. 3 depicts a pair of perpendicular intersecting lines A—A, B—B which lie with a plane C.

FIG. 4 depicts the intersection of a line B—B with the line C—C lying in a plane A. Hence, the intersections of the mutually perpendicular planes A, B, and C define the mutually perpendicular and intersecting lines A—A, B—B and C—C.

The hook 22 is normally constructed of an elongated tempered rod or wire having an eyelet 24 at one end thereof or other similar device for attaching a fishing line (not shown) thereto. The opposite end of the hook is provided with a sharpened tip 26 having a protruding beard or barb 28 which serves to prevent the fish from getting off the hook after the sharpened point 26 and barb 28 have entered the fish tissue or bony structure. The hook is made up of a shank portion generally indicated by reference character 30 which is attached to the eyelet 24 and is curved into a bow portion generally indicated by reference character 32 which curves through approximately 180° terminating in the sharpened tip portion 26 which is directed back in the general direction of the eyelet 24.

Figure 7:
FIG. 7 is a top view of the plastic worm fitted with a hook described in the prior art.
Figure 8:
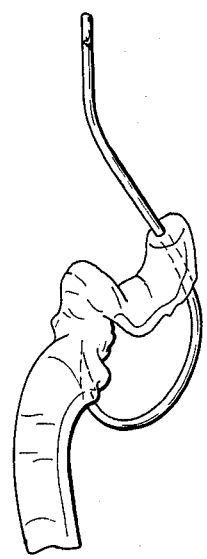
FIG. 8 is a side view of the worm and hook of FIG. 7.

The components hereinbefore described are generally found in prior art fish hooks which are shown particularly in FIGS. 7 and 8. However, in the prior art fish hook, the entire hook lies within a single plane as shown in FIGS. 7 and 8 and is similar to the view of the hook as shown in FIG. 2.

The drawings as shown in FIGS. 2, 3 and 4 depict the eyelet 24 of the hook as lying on the line A—A and spaced above the plane A with the bow portion 32 lying in the plane B. Connected to the eyelet is a straight segment described as the shank leading segment 34 which extends along the line A—A to a bend in the hook at reference character 36. The shank leading segment is provided with a barb means 35 to aid in retaining bait or artificial lure thereon. It is noted that the bend 36 is a compound bend and bends out of the plane C by an angle of $b$ and also bends out of the plane B by an angle of $c$. The hook portion below the compound bend 36 curves into an arc segment 38 and back into the plane B at or near the lower or trailing portion of the hook depicted by reference character 40. The barbed tip 26 and a small portion of the shank attached hereto is then bent out of the plane B in the opposite direction of the arc curve 38 by an angle of $c'$ as clearly shown in FIG. 3. It is also noted that the trailing most point 42 of the hook crosses substantially through or adjacent to the line A—A. It is also pointed out that the sharpened point 26 of the hook is longitudinally spaced from the compound bend 36 by an amount substantially equal to the length of the curve of the arc portion 38 or stated another way the sharpened point 26 substantially trails the leading shank portion 34 and the arc portion 38 for purposes that will be hereinafter set out.

Normally when a plastic worm of the type 10 is connected by what is commonly known as the "Texas Rig" to a prior art type hook, the hook is made to penetrate the upper end 18 of the worm and out of the bottom of the worm at 44. The hook is then rotated through 180° and the sharpened point is reinserted along the bottom of the worm at a point 46 directly in line with the point 44. However, since the barbed tip of the hook 22 is provided with an offset bend angle $c'$ as shown in FIG. 3, the hook may be inserted through a point 48 in the side of the worm 10. This permits the worm, after it is fitted with the hook, to be pulled through the water and still maintain a straight or longitudinal orientation which prevents twisting or cork screwing through the water which results in an undesirable fishing line twisting.

As earlier pointed out another problem with attaching the conventional hook is shown in FIGS. 7 and 8 to the worm occurs when the fish has taken the lure and tries to pull loose. The worm will slide down away from the eyelet as shown in FIGS. 7 and 8 and will tend to bunch up directly above or in front of the sharpened point of the hook thereby not allowing the pointed tip to exit the worm and penetrate the fish's mouth. Further, normally when the prior art lure is taken by the fish, the upper and lower tougher portions of the fish's mouth upon closing form a plane and a hook within its mouth orientates itself to the plane so that the sharpened point thereof is directed to one side or the other of the fish's mouth. Therefore, even if the hook or barbed portion does fully exit the worm, it often hooks the fish on the softer side portions of its mouth whereby a heavy pull on the line often times tears out of the fish's mouth allowing the fish to escape.

However, on the other hand, when the lure fitted with the hook 22 is taken by the fish, two things happen as the hook is pulled through the fish's mouth. First, the upper end of the plastic worm is pulled loose from the shank leading portion 34 and then moved sidewise past the bend 36 onto the arcuate portion 38 which in effect moves the worm body away from the sharpened point 26 thereby allowing the point and barbed portion thereof to exit the worm so that it may penetrate the fish's mouth. Secondly, as the fish's mouth moves past the bend 36 onto the arcuate portion 38 of the hook, the hook will rotate in the fish's mouth about the axis A—A so that the sharpened point 26 thereof is rotated to contact either the fish's upper or lower mouth portion depending upon the direction of rotation. As shown in FIG. 4, the hook when being pulled through the fish's mouth will rotate in a counterclockwise direction through approximately 90° toward the position shown by broken lines 50.

The aforementioned problem of hooking a fish in the soft side portions of the fish's mouth was pointed out in the patent to Hampson U.S. Pat. No. 1,706,881 issued Mar. 26, 1929 for a "Fish Hook" which was particularly designed for hooks which were loaded with bait. However, the patent to Hampson taught the construction of a hook by putting a rather large L-shaped bend causing the leading portion of the hook to lie in one plane while the lower bow portion thereof lies in a plane perpendicular thereto. However, this particular hook was not made to rotate upon being taken by the fish but only to insure that the hook portion be made to penetrate either the upper or lower bony portion of the fish's mouth.

An alternative embodiment of the present invention hereinbefore described is depicted in FIGS. 5 and 6 by the hook generally indicated by reference character 52. The hook 52 is provided with an eyelet 54 at one end thereof and a flattened shank member 56 attached thereto. The lower or trailing portion of the hook 52 is provided with a substantially 180° bow 58 therein and terminates in a barbed sharpened tip portion 60. The eyelet, shank and lower bow portion of the hook is made to lie in one plane while the barbed hook tip 60 is bent or rotated out of the plane by an angle a. This hook 52 may be attached to a plastic worm such as the worm 10 in a manner similar to that of the hook 22. The upper shank portion 62 is flattened to lie substantially in the aforementioned plane while the lower portion or trailing portion 64 is rotated into a plane perpendicular the first mentioned plane.

When the lure is taken by the fish, the upper shank portion thereof is pulled through the fish's mouth the hook is made to rotate in the fish's mouth as the mouth passes over onto the lower shank portion 64. Again it is desirable in the hook 52 that the sharpened point 60 lie below or trailing the flattened portion 64 so that the hook 60 will be in the proper orientation to intersect the upper or lower portion of the fish's mouth while the hook is being pulled therethrough.

The shank portion 56 of the hook 52 may be constructed from two or more rod or tempered wire members affixed side by side to create the same flattened effect as that depicted in FIGS. 5 and 6.

It has been ascertained that the hook 22 will provide sufficient rotation providing that the angle b is between 10° and 45° and the angle c is likewise between 10° and 45°. It is further desirable that the angle c' for the hook 22 and the angle a of the hook 52 be constructed to deviate out of the plane B by an amount between 0° and 45°, or so that the point of the hook is offset approximately one-half the thickness of the artificial worm.

Whereas, the present invention has been described in particular relation to the drawings attached hereto, other and further modifications apart from those shown or suggested herein may be made with the spirit and scope of the invention.

What is claimed is:

1. A fish hook comprising;
   a. line attachment means at a leading end thereof;
   b. a bow portion curved through approximately 180° at the opposite trailing end thereof;
   c. a sharpened barbed end portion carried by the front end of the bow portion;
   d. an elongated shank supported between the rear end of the bow portion and the line attachment means, the shank having a leading straight segment which is attached to the line attachment means and a remaining longer trailing segment attached to the rear end of the bow portion, the juncture between the shank leading and trailing segments comprising a compound bend made up of a rearward bend and a sidewise bend, the said trailing segment being curved into an arcuate segment with the trailing end thereof intersecting the rear end of the bow portion opposite the barbed end at an angle substantially equal to the angle of the sidewise first mentioned bend.

2. A fish hook comprising:
   a. line attachment means at a leading end thereof for attaching a fishing line thereto;
   b. a bow portion curved through approximately 180° at the opposite trailing end thereof and lying in a plane including the line attachment means;
   c. a sharpened barbed end portion carried by a front end of the bow portion and bent sidewise out of a plane of the bow portion;
   d. an elongated shank supported between the rear end of the bow portion and the line attachment means;
   e. rotating means carried by the shank to effect a rotation of the hook through approximately 90° about a longitudinal axis when the hook is moved longitudinally in conjunction with the confinement of the hook in the fish's mouth, the initial forces exerted by the fish's mouth being perpendicular to said plane;
   f. an elongated flexible plastic worm carried by said rotating fish hook, said worm comprising an elongated body, a leading blunted end and a trailing tail portion at the opposite end, wherein the worm leading end is penetrated by the hook and is disposed on the shank adjacent the eyelet, the shank adjacent the bow portion exiting the worm body at a point on one side thereof, and the sharpened barbed end portion repenetrating the worm body at a point traversely offset from longitudinal alignment with the first mentioned point, in the direction of the sidewise bend of the sharpened barbed end portion.

3. A fish hook comprising:
   a. line attachment means at a leading end thereof;
   b. a curved bow portion at the opposite trailing end thereof and substantially lying in a plane containing said line attachment means;
   c. a sharpened barbed end portion carried by a front end of the bow portion;
   d. an elongated shank supported between the rear end of the bow portion and the line attachment means said shank comprising:
      a leading end segment adjacent the line attachment means and substantially lying in said plane and a longer trailing segment adjacent the rear end of the bow portion, said trailing segment being bent rearwardly and outwardly from the leading end segment out of said plane and being arcuately curved back into said plane at the rear end of the bow portion.

4. A fish hook as set forth in claim 3 wherein the rearward bend is not more than 40° within the plane of the outward bend is not more than 45° out of said plane.

5. A fish hook as set forth in claim 4 wherein the sharpened barbed end portion is bent sideways out of the plane in a direction opposite that of the trailing shank arcuate segment by an angle of not less than 10° nor more than 45°.

6. A fish hook as set forth in claim 5 wherein the sidewise bend of the barbed end portion is substantially equal to the outward bend of the shank.

7. A fish hook for hooking a fish after the hook is confined in the fish's mouth and comprising;
   a. line attachment means at a leading end thereof for attaching a fishing line thereto;
   b. a bow portion curved through approximately 180° at the opposite trailing end thereof and lying in a plane, said plane including the line attachment means;
   c. a sharpened barbed end portion carried by a front end of the bow portion;
   d. an elongated shank supported between the rear end of the bow portion and the line attachment means;
   e. rotating means carried by the shank to effect a rotation of the hook through approximately 90° about a longitudinal axis when the hook is moved longitudinally in conjunction with the confinement of the hook in the fish's mouth, the initial forces exerted by the fish's mouth being perpendicular to the said plane, wherein the rotating means is effected by the shank being a flattened straight member having a leading segment adjacent to the line attachment means lying in the plane of the bow and a longer trailing segment adjacent the rear end of the bow portion being twisted about a longitudinal axis through 90° to lie in a plane perpendicular to the first mentioned plane.

8. A fish hook as set forth in claim 7 wherein the sharpened, barbed end portion is bent sideways out of said first mentioned plane by an angle of no less than 10° and not more than 45°.

* * * * *